(12) United States Patent  
Yaguchi (10) Patent No.: US 7,821,214 B2  
(45) Date of Patent: Oct. 26, 2010

(54) LOAD DRIVING APPARATUS, VEHICLE INCORPORATING THE SAME, AND CONTROL METHOD FOR LOAD DRIVING APPARATUS

(75) Inventor: Hideaki Yaguchi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 281 days.

(21) Appl. No.: 12/223,645

(22) PCT Filed: Apr. 20, 2007

(86) PCT No.: PCT/JP2007/059143

§ 371 (c)(1),  
(2), (4) Date: Aug. 6, 2008

(87) PCT Pub. No.: WO2007/126038

PCT Pub. Date: Nov. 8, 2007

(65) Prior Publication Data

US 2009/0021200 A1    Jan. 22, 2009

(30) Foreign Application Priority Data

Apr. 24, 2006 (JP) .............................. 2006-119289

(51) Int. Cl.  
*H02P 7/00* (2006.01)

(52) U.S. Cl. .................. 318/400.09; 318/430; 318/432; 307/9.1; 320/134; 320/162

(58) Field of Classification Search ............ 318/400.02, 318/400.09, 430, 432; 307/9.1; 320/134, 320/162  
See application file for complete search history.

(56) References Cited

U.S. PATENT DOCUMENTS

2006/0052915 A1    3/2006    Sato  
2006/0247829 A1    11/2006   Sato (Continued)

FOREIGN PATENT DOCUMENTS

JP    A-5-328530    12/1993

(Continued)

OTHER PUBLICATIONS

Office Action for Russian Application No. 2008146058/11 (060201), mailed on Dec. 24, 2009 (w/ English translation).

(Continued)

*Primary Examiner*—Paul Ip  
(74) *Attorney, Agent, or Firm*—Oliff & Berridge, PLC (57) ABSTRACT

An ECU estimates an output allowable power of a power storage device based on the temperature and SOC of the power storage device. The ECU also calculates a threshold power based on the power required to start an engine. When the ECU determines that the output allowable power is lower than the threshold power, the up-converter is controlled such that the boosting rate of the up-converter is restricted to be below a prescribed value.

16 Claims, 7 Drawing Sheets

U.S. PATENT DOCUMENTS

| | | | |
|---|---|---|---|
| 2007/0104468 A1* | 5/2007 | Ueno et al. | 388/815 |
| 2009/0108794 A1* | 4/2009 | Ochiai et al. | 318/760 |
| 2009/0121669 A1* | 5/2009 | Hanada | 318/504 |
| 2009/0160248 A1* | 6/2009 | Ang | 307/9.1 |
| 2009/0160249 A1* | 6/2009 | Soma et al. | 307/9.1 |
| 2009/0279337 A1* | 11/2009 | Hamatani | 363/132 |
| 2009/0315403 A1* | 12/2009 | Ichikawa et al. | 307/82 |
| 2009/0315518 A1* | 12/2009 | Soma et al. | 320/134 |
| 2009/0319107 A1* | 12/2009 | Soma | 701/22 |
| 2009/0322503 A1* | 12/2009 | Suzuki et al. | 340/438 |
| 2010/0019734 A1* | 1/2010 | Oyobe et al. | 320/162 |
| 2010/0026311 A1* | 2/2010 | Mitsutani | 324/537 |

FOREIGN PATENT DOCUMENTS

| | | |
|---|---|---|
| JP | A-07-115704 | 5/1995 |
| JP | A-2003-070103 | 3/2003 |
| JP | A-2004-166341 | 6/2004 |
| JP | A-2004-183570 | 7/2004 |
| JP | A-2004-208409 | 7/2004 |
| JP | A-2004-274945 | 9/2004 |
| JP | A-2005-160284 | 6/2005 |
| JP | A-2005-237149 | 9/2005 |
| RU | 2 200 871 C2 | 3/2003 |

OTHER PUBLICATIONS

Decision on Grant for Russian Application No. 2008146058, issued on May 7, 2010 (w/ English translation).

\* cited by examiner

LOAD DRIVING APPARATUS, VEHICLE INCORPORATING THE SAME, AND CONTROL METHOD FOR LOAD DRIVING APPARATUS

TECHNICAL FIELD

The present invention relates to a load driving apparatus, a vehicle incorporating the load driving apparatus, and a control method for the load driving apparatus. Particularly, the present invention relates to control for a load driving apparatus that drives a rotating electric machine that can start an internal combustion engine.

BACKGROUND ART

Japanese Patent Laying-Open No. 2005-237149 discloses a power supply device for a vehicle. This power supply device for a vehicle includes a battery, an up-converter, and a starter unit to start an engine. The battery, up-converter, and starter unit are connected to a power supply line through which a power supply voltage of an electric load is supplied.

When the up-converter is inactive, the output voltage of the battery is supplied to the power supply line. When the up-converter is active, the voltage boosted by the up-converter is supplied to the power supply line. The up-converter operates intermittently in accordance with the operating period of the starter unit. Specifically, the voltage supplied to the starter unit is boosted by the up-converter in this power supply device for a vehicle when the engine is started by the starter unit.

When the up-converter is operated, the loss at the up-converter as well as the loss at the inverter directed to driving the starter motor will be increased. Therefore, in the case where the temperature is extremely low such that the battery output is significantly reduced and the cranking resistance of the engine is increased, for example, the power to drive the starter motor at the time of engine startup may be so low that there is a possibility of not being able to start the engine.

DISCLOSURE OF THE INVENTION

In view of the foregoing, an object of the present invention is to provide a load driving apparatus including a boosting device, capable of reducing power loss to ensure the engine startup power, and a vehicle incorporating the load driving apparatus.

Another object of the present invention is to provide a control method for a load driving apparatus including a boosting device, capable of reducing power loss to ensure the engine startup power.

According to the present invention, a load driving apparatus capable of driving a rotating electric machine having a rotational shaft coupled to an output shaft of an internal combustion engine includes a power storage device, a boosting device, a driving device, and a control device. The boosting device is configured to allow boosting of a voltage from the power storage device. The driving device receives an output voltage from the boosting device to drive the rotating electric machine. The control device controls the boosting device. The control device controls the boosting device such that a voltage boosting rate by the boosting device is restricted to be below a prescribed value when the rotating electric machine is driven to start the internal combustion engine.

Preferably, the prescribed value is determined such that the output voltage from the boosting device is substantially equal to the voltage from the power storage device.

In addition, the control device preferably stops the boosting device when the internal combustion engine is started.

Preferably, the control device controls the boosting device such that the voltage boosting rate is restricted to be below a prescribed value when an output power from the power storage device is lower than a threshold value.

Further preferably, the threshold value is determined based on the power required to start the internal combustion engine by the rotating electric machine.

Preferably, the control device controls the boosting device such that the voltage boosting rate is restricted to be below a prescribed value when the temperature of the power storage device is lower than a prescribed temperature.

In addition, the control device preferably controls the boosting device such that the voltage boosting rate is restricted to be below a prescribed value when the temperature of the internal combustion engine is lower than a prescribed temperature.

Preferably, the power storage device is formed of a lithium-ion secondary battery.

According to the present invention, a vehicle includes an internal combustion engine, a rotating electric machine having a rotational shaft connected to an output shaft of the internal combustion engine, and a load driving apparatus set forth above capable of driving the rotating electric machine.

Further, according to the present invention, a control method for a load driving apparatus is directed to a control method for a load driving apparatus capable of driving a rotating electric machine having a rotational shaft coupled to an output shaft of an internal combustion engine. The load driving apparatus includes a power storage device, a boosting device, and a driving device. The boosting device is configured to allow boosting of a voltage from the power storage device. The driving device receives an output voltage from the boosting device to drive the rotating electric machine. The control method includes the steps of determining whether a request to drive the rotating electric machine to start the internal combustion engine is made or not, and restricting a voltage boosting rate by the boosting device to be below a prescribed value when determination is made that a request to start the internal combustion engine has been made.

Preferably, the prescribed value is determined such that the output voltage is substantially equal to the voltage from the power storage device.

Preferably, in the step of restricting the voltage boosting rate, the boosting device is stopped when determination is made that a request to start the internal combustion engine has been made.

Preferably, the control method for a load driving apparatus further includes the step of determining whether an output power from the power storage device is lower than a threshold value. When determination is made that the output power is lower than the threshold value, the voltage boosting rate is restricted to be below the prescribed value in the step of restricting the voltage boosting rate.

Further preferably, the threshold value is determined based on the power. required to start the internal combustion engine by the rotating electric machine.

Preferably, the method further includes the step of determining whether the temperature of the power storage device is lower than a prescribed temperature. When determination is made that the temperature of the power storage device is lower than the prescribed temperature, the voltage boosting rate is restricted to be below the prescribed value in the step of restricting the voltage boosting rate.

Further preferably, the method further includes the step of determining whether the temperature of the internal combustion engine is lower than a prescribed temperature. When determination is made that the temperature of the internal combustion engine is lower than the prescribed temperature, the voltage boosting rate is restricted to be below the prescribed value in the step of restricting the voltage boosting rate.

According to the present invention, the output voltage from the boosting device is reduced since the voltage boosting rate by the boosting device is restricted to be below a prescribed value when the rotating electric machine is driven to start the internal combustion engine. Accordingly, the loss at the boosting device is reduced. In addition, the loss at the driving device receiving the output voltage from the boosting device is also reduced. . According to the present invention, sufficient power required to start the internal combustion engine can be ensured. As a result, even when in an extremely low temperature state where the output of the power storage device is significantly reduced and the cranking resistance of the internal combustion engine increases, the power required to start the internal combustion engine can be ensured. In addition, the power storage device can be reduced in size in accordance with the present invention.

BEST MODES FOR CARRYING OUT THE INVENTION

Embodiments of the present invention will be described in detail hereinafter with reference to the drawings. In the drawings, the same or corresponding elements have the same reference characters allotted, and the description thereof will not be repeated.

First Embodiment

Figure 1:
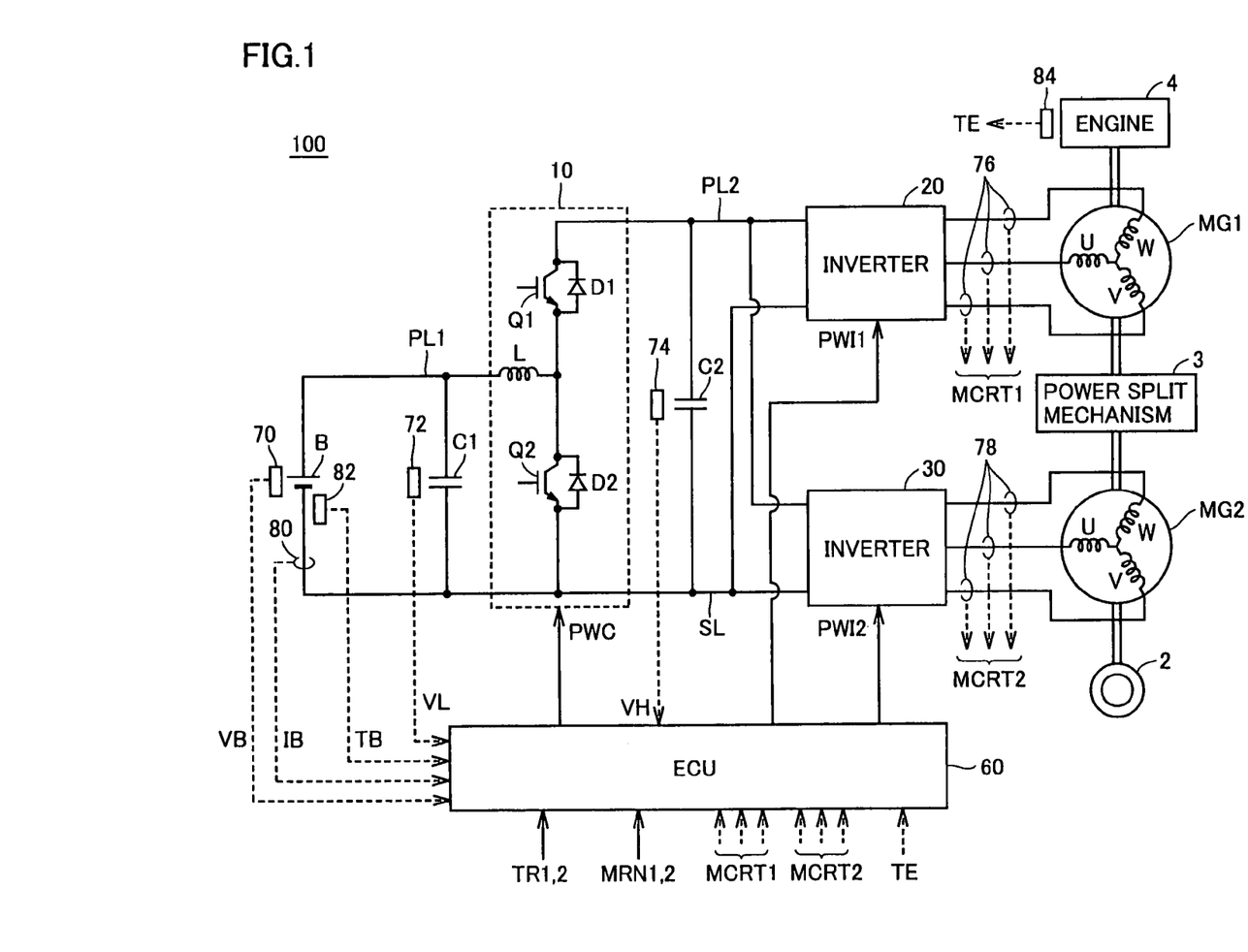
FIG. 1 is an entire block diagram of a hybrid vehicle represented as an example of a vehicle in which a load driving apparatus according to a first embodiment of the present invention is incorporated.

FIG. 1 is an entire block diagram of a hybrid vehicle represented as an example of a vehicle in which a load driving apparatus according to the first embodiment of the present invention is incorporated. Referring to FIG. 1, this hybrid vehicle 100 includes a wheel 2, a power split mechanism 3, an engine 4, and motor generators MG1 and MG2. Hybrid vehicle 100 further includes a power storage device B, an up-converter 10, inverters 20 and 30, capacitors C1 and C2, power supply lines PL1 and PL2, a ground line SL, an electronic control unit (hereinafter, also referred to as "ECU") 60, voltage sensors 70, 72, and 74, current sensors 76, 78 and 80, and temperature sensors 82, 84.

Power split mechanism 3 is coupled to engine 4 and motor generators MG1 and MG2 to split power therebetween. For example, a planetary gear mechanism including the three rotational shafts of a sun gear, a planetary carrier, and a ring gear can be employed as power split mechanism 3. These three rotational shafts are connected to the rotational shaft of each of engine 4 and motor generators MG1 and MG2, respectively. For example, by passing the crankshaft of engine 4 through the center of a hollow rotor of motor generator MG1, mechanical connection of power split mechanism 3 with engine 4 and also motor generators MG1 and MG2 can be established.

The rotational shaft of motor generator MG2 is coupled to wheel 2 by a reduction gear or differential gear not shown. In addition, a reduction gear for the. rotational shaft of motor generator MG2 can be further incorporated in power split mechanism 3.

Motor generator MG1 is incorporated into hybrid vehicle 100 functioning as an electric motor that can start engine 4, and also as a power generator that can generate power using the motive force of engine 4 after engine 4 is started. Motor generator MG2 is incorporated into hybrid vehicle 100 functioning as an electric motor that can drive wheel 2.

Power storage device B is a direct current power supply that can be charged and discharged. For example, it is formed of a secondary battery of nickel hydrogen, lithium ions, and the like. Power storage device B supplies direct current power to power supply line PL1. Power storage device B receives the direct current power output from up-converter 10 onto power supply line PL1 to be charged.

Voltage sensor 70 detects a voltage VB of power storage device B to provide the detected voltage VB to ECU 60. Current sensor 80 detects a current IB that is input to and output from power storage device B to provide the detected current IB to ECU 60. Temperature sensor 82 detects a temperature TB of power storage device B to provide the detected temperature TB to ECU 60. Current sensor 80 may be provided at power supply line PL1.

Capacitor C1 is connected between power supply line PL1 and ground line SL to smooth the voltage variation between power supply line PL1 and ground line SL. Voltage sensor 72 detects a voltage VL across capacitor C1 to provide the detected voltage VL to ECU 60.

Up-converter 10 includes npn type transistors Q1 and Q2, diodes D1 and D2, and a reactor L. Npn type transistors Q1 and Q2 are connected in series between power supply line PL2 and ground line SL. Diodes D1 and D2 are connected anti-parallel to npn type transistors Q1 and Q2, respectively. Reactor L is connected between power supply line PL1 and the connection node of npn type transistors Q1 and Q2.

Up-converter 10 boosts the voltage of power supply line PL1 to provide the boosted voltage onto power supply line PL2 based on a signal PWC from ECU 60. Specifically, up-converter 10 stores the current flowing when npn type transistor Q2 is ON as the magnetic field energy at reactor L, and discharges the storage energy onto power supply line PL2 via diode D1 when npn type transistor Q2 is OFF to boost the voltage of power supply line PL1.

Since the power accumulated at reactor L becomes larger by increasing the ON duty of npn type transistor Q2, power of higher voltage can be obtained. By increasing the ON duty of npn type transistor Q1, the voltage of power supply line PL2 is reduced. By controlling the duty ratio of npn type transistors Q1 and Q2, the voltage of power supply line PL2 can be regulated to an arbitrary voltage level of at least the voltage on power supply line PL1.

Capacitor C2 is connected between power supply line PL2 and ground line SL to smooth the voltage variation between power supply line PL2 and ground line SL. Voltage sensor 74 detects a voltage VH across capacitor C2 to provide the detected voltage VH to ECU 60.

Inverters 20 and 30 are provided corresponding to motor generators MG1 and MG2, respectively. Inverter 20 drives motor generator MG1 in a power running mode or regenerative mode based on a signal PWI1 from ECU 60. Inverter 30 drives motor generator MG2 in a power running mode or regenerative mode based on a signal PWI2 from ECU 60.

Current sensor 76 detects a motor current MCRT1 flowing to motor generator MG1 to provide the detected motor generator MCRT1 to ECU 60. Current sensor 78 detects a motor current MCRT2 flowing to motor generator MG2 to provide the detected motor current MCRT2 to ECU 60. Temperature sensor 84 detects a temperature TE of engine 4 to provide the detected temperature TE to ECU 60. Temperature sensor 84 may identify the temperature of engine 4 by detecting the temperature of the coolant of engine 4.

ECU 60 receives voltages VL and VH from voltage sensors 72 and 74, respectively, and receives motor currents MCRT1 and MCRT2 from current sensors 76 and 78, respectively. ECU 60 also receives torque control values TR1 and TR2 and motor speed counts MRN1 and MRN2 of motor generators MG1 and MG2 from an external ECU not shown. ECU 60 further receives voltage VB, current IB and temperature TB from voltage sensor 70, current sensor 80, and temperature sensor 82, respectively, and temperature TE from temperature sensor 84.

ECU 60 generates signals PWC, PWI1 and PWI2 to drive up-converter 10 and motor generators MG1 and MG2, respectively, based on the received signal, and provides the generated signals PWC, PWI1 and PWI2 to up-converter 10 and inverters 20 and 30, respectively.

Figure 2:
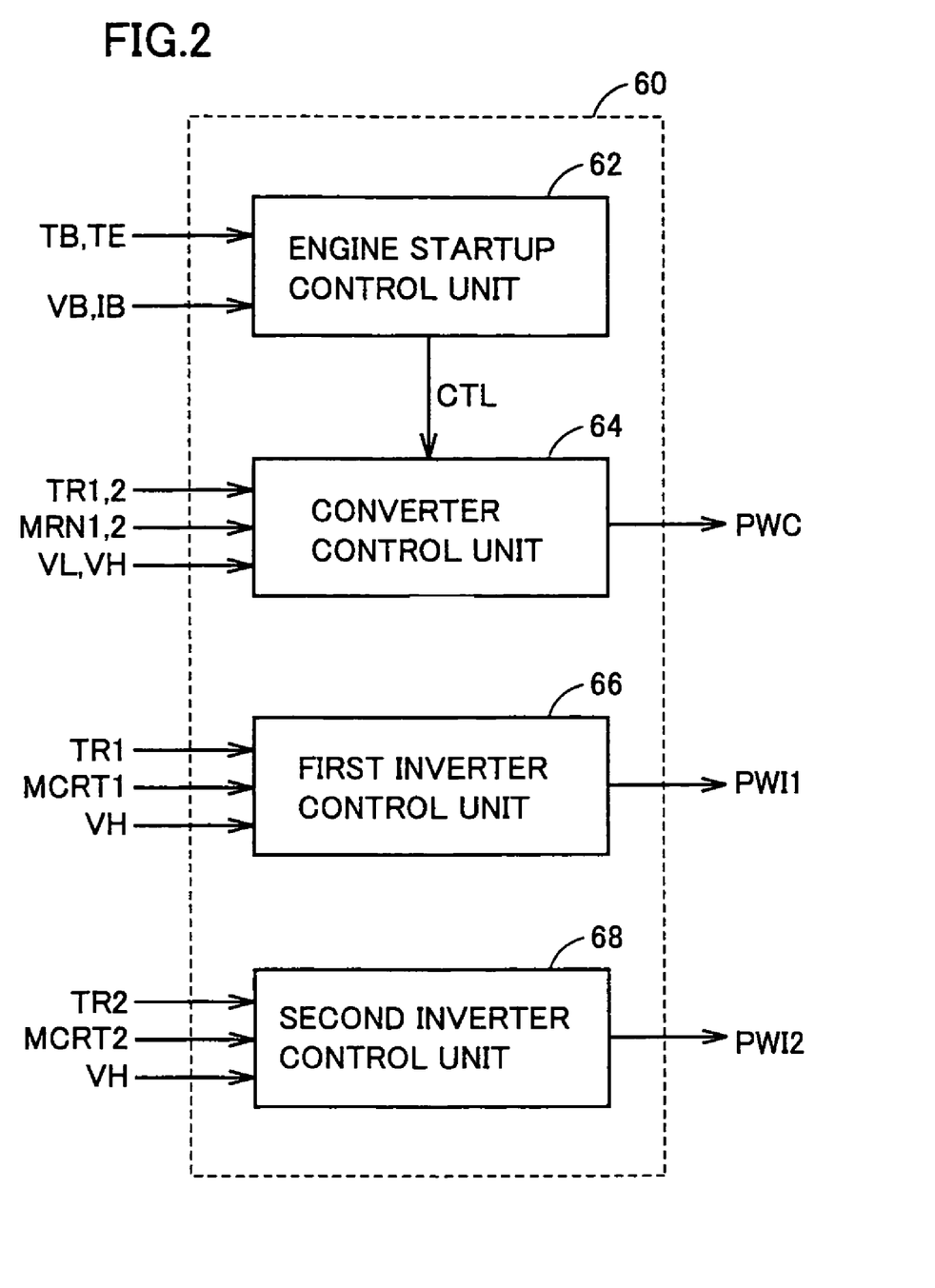
FIG. 2 is a functional block diagram of an ECU shown in FIG. 1.

FIG. 2 is a functional block diagram of ECU 60 of FIG. 1. Referring to FIG. 2, ECU 60 includes an engine startup control unit 62, a converter control unit 64, and first and second inverter control units 66 and 68.

When engine 4 is started, engine startup control unit 62 determines whether the output allowable power of power storage device B is below a predetermined threshold power by a method that will be described afterwards, based on temperature TB, voltage VB, and current IB of power storage device B, and temperature TE of engine 4. When engine startup control unit 62 determines that the output allowable power of power storage device B is below the threshold power, a signal CTL that will be provided to converter control unit 64 is rendered active to instruct converter control unit 64 to restrict the boosting rate of up-converter 10 to be below a prescribed value.

When signal CTL from engine startup control unit 62 is inactive, converter control unit 64 generates a signal PWC to turn on/off npn type transistors Q1 and Q2 of up-converter 10 by a method that will be described afterwards, based on torque control values TR1 and TR2, motor speed counts MRN1 and MRN2, and voltages VL and VH. The generated signal PWC is output to up-converter 10.

When signal CTL is active, converter control unit 64 generates signal PWC to restrict the boosting rate of up-converter 10 to be below the prescribed value, and provides generated signal PWC to up-converter 10. This prescribed value is provided for the purpose of restricting the boosting by up-converter 10 when engine 4 is started. The prescribed value is set to 1, or a value in the vicinity of 1.

First inverter control unit 66 generates a PWM (Pulse Width Modulation) signal to drive inverter 20, based on torque control value TR1, motor current MCRT1 and voltage VH to provide the generated PWM signal to inverter 20 as signal PWI1.

Second inverter control unit 68 generates a PWM signal to drive inverter 30 based on torque control value TR2, motor current MCRT2 and voltage VH to provide the generated PWM signal to inverter 30 as signal PWI2.

At ECU 60, the boosting rate of up-converter 10 is restricted to be below the prescribed value for the purpose of restricting the boosting by up-converter 10 when the output allowable power of power storage device B is lower than a predetermined threshold power at the startup of engine 4. The reason why the boosting by up-converter 10 is restricted is set forth below.

Power Pg required for the startup of engine 4 can be represented by the following equation.

$$Pg = Pb - Pc - Pg - Pm - Lc - Lg - Lm \quad (1)$$

where Pb represents the power output from power storage device B, Pc represents the power charged to capacitors C1 and C2, Pg represents the effective power of motor generator MG1, Pm represents the effective power of motor generator MG2, Lc represents the loss at up-converter 10, Lg represents the loss at inverter 20, and Lm represents the loss at inverter 30.

By restricting the boosting effected by up-converter 10, loss Lc at up-converter 10 can be reduced. Since the storage energy of a capacitor is proportional to the square of the voltage across the capacitor, reduction in voltage VH by restricting the boosting of up-converter 10 will cause reduction in the storage energy of capacitor C2. As a result, power Pc is reduced. In view of the loss at an inverter being proportional to the voltage, reduction in voltage VH leads to reduction in loss Lg and Lm at inverters 20 and 30 that receive the supply of voltage VH.

Thus, restricting the boosting by up-converter 10 is extremely effective in ensuring power Pg required to start engine 4. The first embodiment is directed to restricting the boosting operation of up-converter 10 to ensure power Pg in an extremely low temperature state where the output allowable power of power storage device B is reduced.

Figure 3:
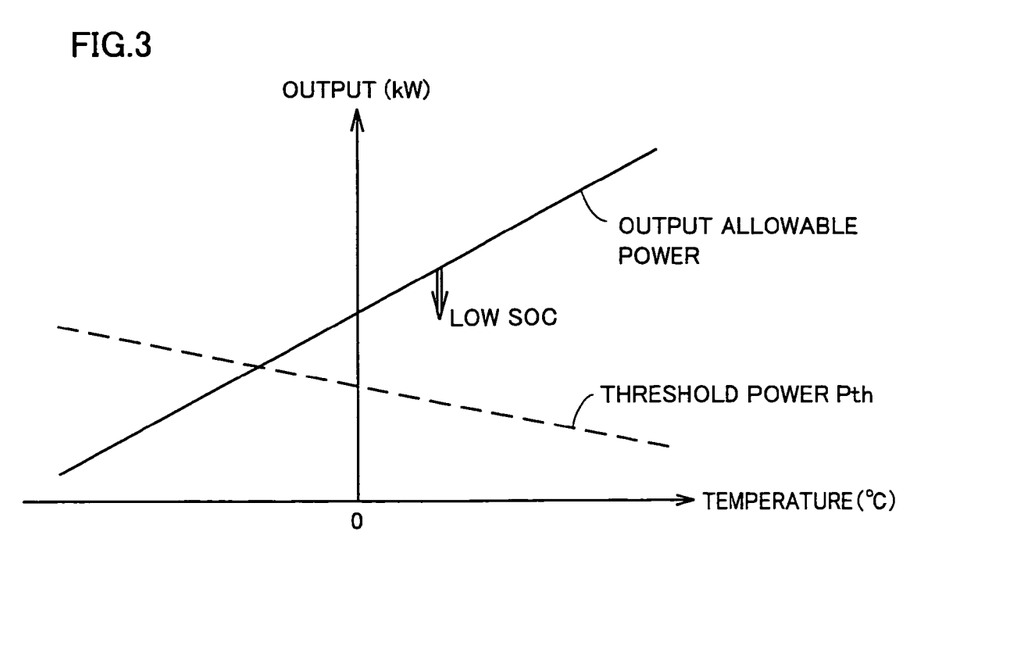
FIG. 3 is a diagram representing the relationship between the temperature and output of a power storage device.
Figure 4:
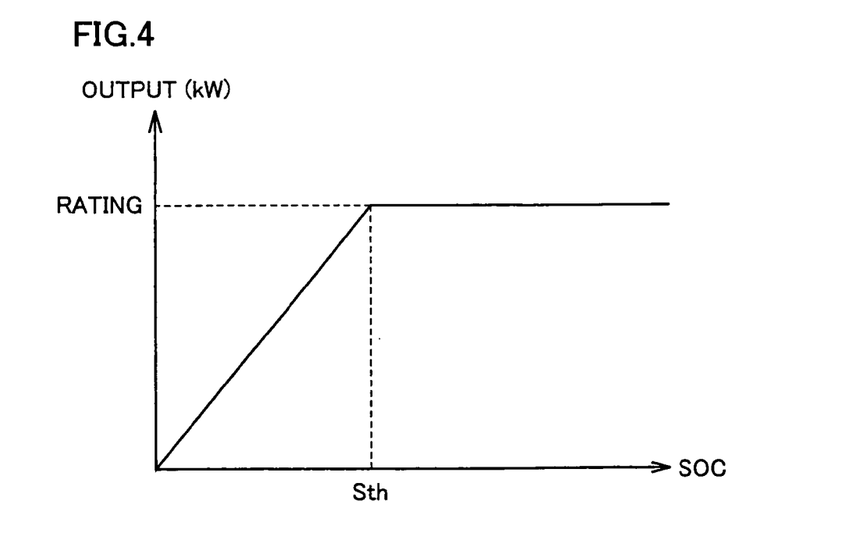
FIG. 4 is a diagram representing the relationship between the SOC and output of a power storage device.

FIG. 3 represents the relationship between the temperature and output of power storage device B. Referring to FIG. 3, the solid line represents the output allowable power of power storage device B. As shown in the drawing, the output allowable power of power storage device B is reduced as the temperature of power storage device B becomes lower. In addition, when the state of charge (SOC) of power storage device B is reduced, the output of power storage device B will become lower than the rating, as shown in FIG. 4. Therefore, the output allowable power of power storage device B will also be reduced if the SOC becomes lower.

In view of the foregoing, the output allowable power of power storage device B is estimated based on the temperature and SOC of power storage device B in the first embodiment when engine 4 is started. In the case where the estimated output allowable power is lower than a predetermined threshold power Pth represented by the dotted line, the boosting operation to be carried out by up-converter 10 is restricted.

Threshold power Pth is determined in advance based on power Pg required for the startup of engine 4. Specifically, since power Pg required to start engine 4 can be estimated in advance depending upon the size of engine 4 and motor generator MG1, an appropriate value larger than power Pg can be set as threshold power Pth using equation (1) set forth above.

The reason why threshold power Pth is increased as a function of reduction in the temperature in FIG. 3 will be described here. Since the viscosity of the lubricating oil of engine 4 is increased as the temperature becomes lower, the cranking resistance is increased. This leads to increase of power Pg required to start engine 4.

Figure 5:
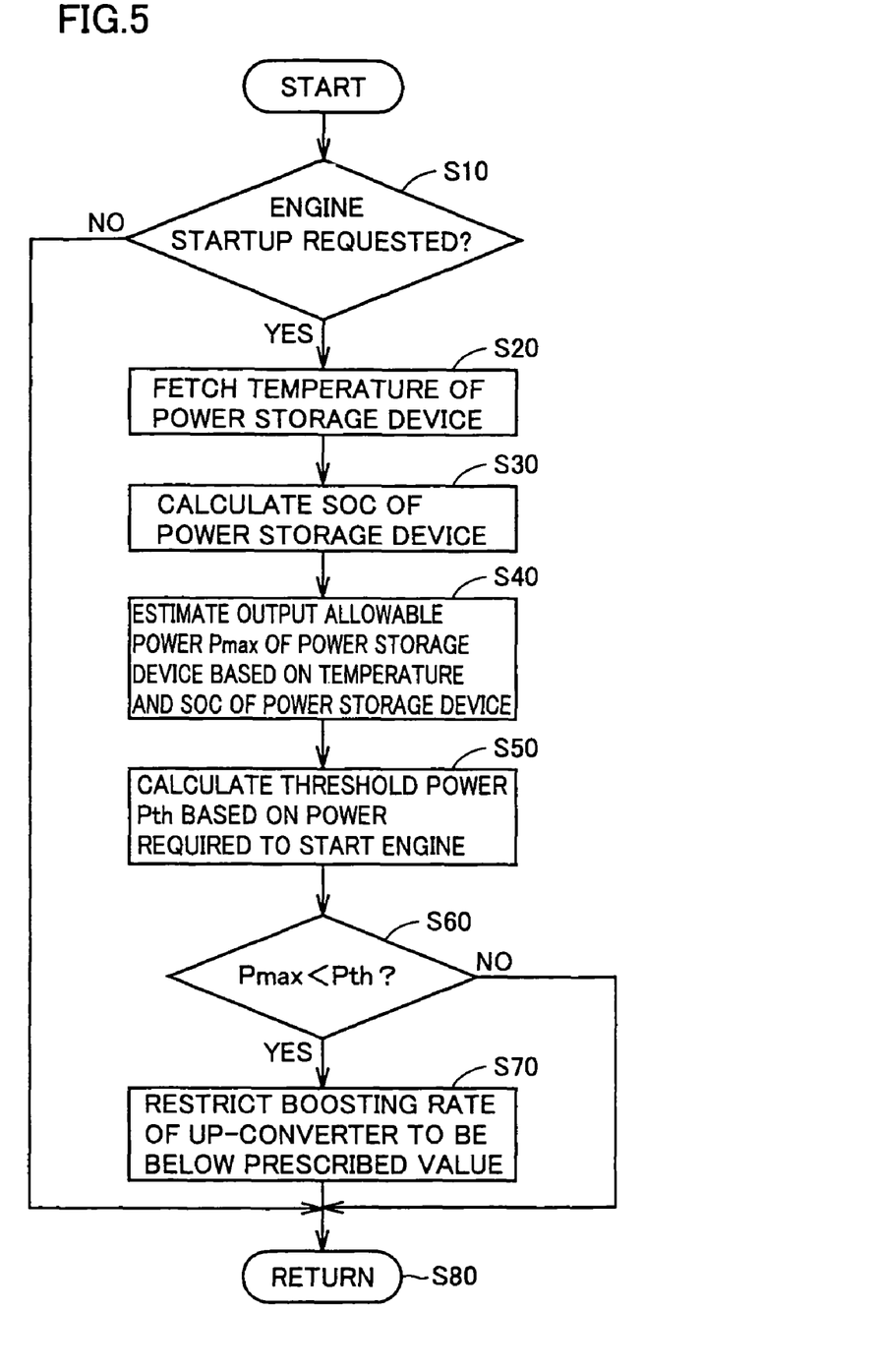
FIG. 5 is a flowchart to describe a control configuration of the engine startup control unit of FIG. 2.

FIG. 5 is a flowchart to describe the control configuration of engine startup control unit 62 shown in FIG. 2. The process in this flowchart is called from the main routine to be executed at a constant interval or every time a predetermined condition is established.

Referring to FIG. 5, engine startup control unit 62 determines whether a request to start engine 4 is made or not (step S10). This engine startup request is generated based on the running state of the vehicle or the SOC of power storage device B and the like at, for example, an external ECU not shown. When engine startup control unit 62 determines that a startup request of engine 4 is not made (NO at step S10), control proceeds to step S80 without carrying out the series of steps set forth below.

When determination is made that a startup request of engine 4 is made at step S10 (YES at step S10), engine startup control unit 62 fetches temperature TB of power storage device B from temperature sensor 82 (step S20). Then, engine startup control unit 62 calculates the SOC of power storage device B (step S30). The SOC of power storage device B can be calculated by the well-known method using current IB, voltage VB, temperature TB, and the like of power storage device B. The SOC of power storage device B can be calculated at an external ECU to allow the SOC to be provided to engine startup control unit 62 from the external ECU.

Next, engine startup control unit 62 estimates an output allowable power Pmax of power storage device B based on temperature TB and the SOC of power storage device B (step S40). As one method of estimating output allowable power Pmax, the relationship of the output allowable power of power storage device B with respect to the temperature and SOC thereof can be defined in a map in advance based on the relationship as shown in FIGS. 3 and 4, for example, to carry out estimation based on the prepared map.

Then, engine startup control unit 62 calculates threshold power Pth based on the power required to start engine 4 by the aforementioned method (step S50). Engine startup control unit 62 determines whether output allowable power Pmax of power storage device B is lower than threshold power Pth (step S60).

When engine startup control unit 62 determines that output allowable power Pmax is lower than threshold power (YES at step S60), signal CTL to be output to converter control unit 64 is rendered active. In response, converter control unit 64 controls up-converter 10 such that the boosting rate of up-converter 10 is restricted to be below a prescribed value. Thus, the boosting rate of up-converter 10 is restricted to a level lower than the prescribed value (step S70).

When determination is made that output allowable power Pmax is equal to or higher than threshold power Pth at step S60 (YES at step S60), engine startup control unit 62 proceeds to step S80. Control returns to the main routine.

Figure 6:
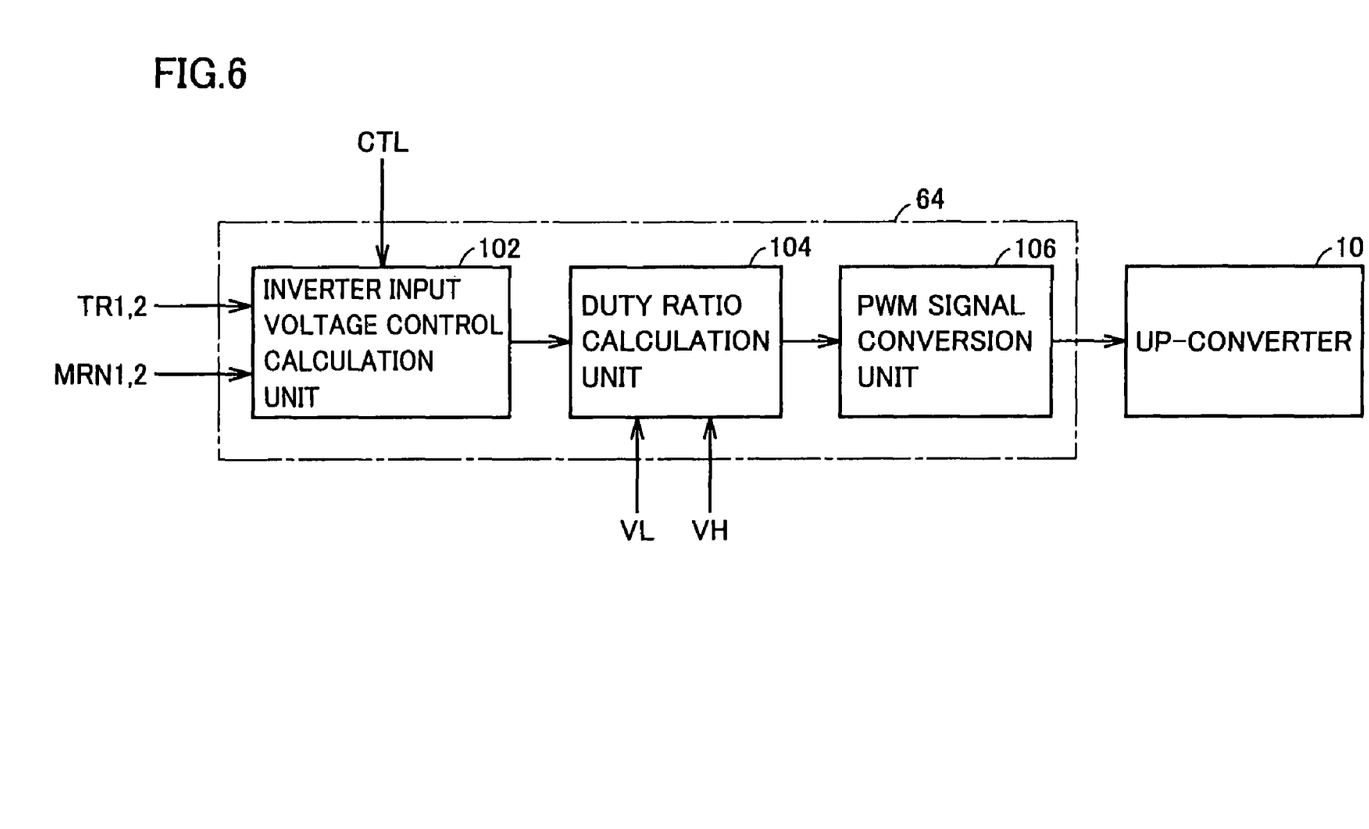
FIG. 6 is a detailed functional block diagram of a converter control unit shown in FIG. 2.

FIG. 6 is a detailed functional block diagram of converter control unit 64 shown in FIG. 2. Referring to FIG. 6, converter control unit 64 includes an inverter input voltage control calculation unit 102, a duty ratio calculation unit 104, and a PWM signal conversion unit 106.

Inverter input voltage control calculation unit 102 calculates as optimum value (target value) of an inverter input voltage, i.e. a voltage control value Vcom, based on torque control values TR1 and TR2 and motor speed counts MRN1 and MRN2, when signal CTL from engine startup control unit 62 not shown is inactive. The calculated voltage control Vcom is output to duty ratio calculation unit 104.

Inverter input voltage control calculation unit 102 calculates voltage control Vcom such that the boosting rate of up-converter 10 is restricted to be below a prescribed value when signal CTL is active. The calculated voltage control Vcom is output to duty ratio calculation unit 104.

Duty ratio calculation unit 104 calculates the duty ratio to regulate voltage VH to voltage control Vcom based on voltages VL and VH from voltage sensors 72 and 74, respectively, and voltage control Vcom from inverter input voltage control calculation unit 102. The calculated duty ratio is provided to PWM signal conversion unit 106.

PWM signal conversion unit 106 generates a PWM signal to turn on/off npn type transistors Q1 and Q2 of up-converter 10 based on the duty ratio received from duty ratio calculation unit 104. The generated PWM signal is provided to npn type transistors Q1 and Q2 of up-converter 10 as signal PWC.

It is to be noted that duty ratio calculation unit 104 may set a duty ratio determined in advance such that the boosting rate of up-converter 10 is restricted to be below a prescribed value, independent of voltage control Vcom from inverter input voltage control calculation unit 102 in the case where signal CTL received from engine startup control unit 62 is active.

Thus, ECU 60 controls up-converter 10 such that the boosting rate of up-converter 10 is restricted to be below a prescribed value in a startup mode of engine 4 in the first embodiment. Therefore, the output voltage of up-converter 10 (input voltage of inverters 20 and 30) can be reduced. Thus, the loss at up-converter 10 and inverters 20 and 30 can be reduced, and the power charged to capacitor C2 can be also reduced. According to the first embodiment, sufficient power required to start engine 4 can be ensured. As a result, the power required to start engine 4 can be ensured even when in an extremely low temperature state where the output of power storage device B is significantly reduced and the cranking resistance of engine 4 is increased. Furthermore, power storage device B can be reduced in size.

Second Embodiment

The first embodiment is directed to controlling up-converter 10 such that the boosting rate of up-converter 10 is restricted to be below a prescribed value when output allowable power Pmax is lower than threshold power Pth. In the second embodiment, the operation of up-converter 10 is stopped when output allowable power Pmax is lower than threshold power Pth.

Figure 7:
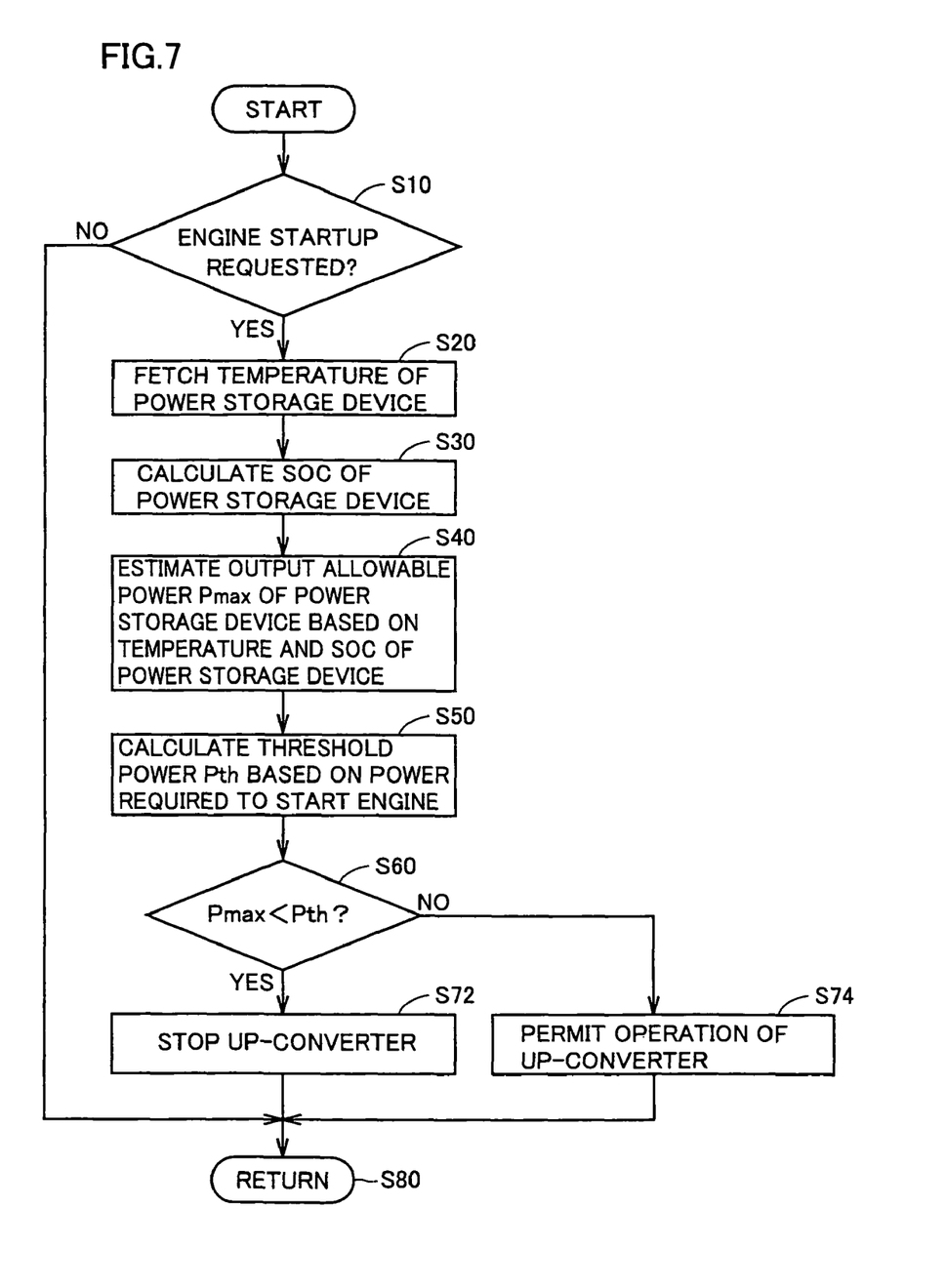
FIG. 7 is a flowchart to describe control of an up-converter in an engine startup mode according to a second embodiment.

FIG. 7 is a flowchart to describe the control of up-converter 10 in an engine startup mode of the second embodiment. Referring to FIG. 7, the process in this flowchart includes steps S72 and S74 instead of step S70 in the flowchart of FIG. 5.

Specifically, when determination is made that output allowable power Pmax is lower than threshold power Pth at step S60 (YES at step S60), engine startup control unit 62 renders signal CTL that is to be output to converter control unit 64 active. In response, converter control unit 64 stops up-converter 10 (step S72). Specifically, converter control unit 64 sets npn type transistor Q1 corresponding to the upper arm constantly ON, and sets npn type transistor Q2 corresponding to the lower arm constantly OFF. Accordingly, the boosting rate of up-converter 10 is set to the lowest value of 1. Voltage VH attains a level identical to that of voltage VB of power storage device B.

When determination is made that output allowable power Pmax is equal to or higher than threshold power Pth at step S60 (NO at step S60), engine startup control unit 62 renders signal CTL that is to be output to converter control unit 64 inactive. In response, converter control unit 64 permits the operation of up-converter 10 (step S74). Specifically, converter control unit 64 controls up-converter 10 in a normal manner based on torque control values TR1 and TR2 and motor speed counts MRN1 and MRN2.

According to the second embodiment, the operation of up-converter 10 is ceased when engine 4 is started, as set forth above. Thus, an advantage similar to that of the. first embodiment can be provided through simple control.

Third Embodiment

Figure 8:
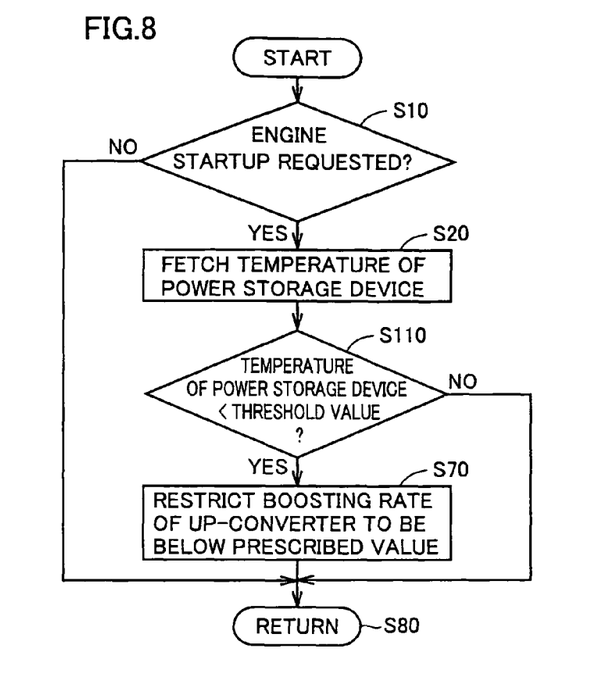
FIG. 8 is a flowchart to describe control of an up-converter in an engine startup mode according to a third embodiment.

FIG. 8 is a flowchart to describe the control of up-converter 10 at an engine startup mode of the third embodiment. Referring to FIG. 8, the process in this flowchart includes step S110 instead of steps S30-S60 in the flow chart of FIG. 5. Specifically, upon fetching temperature TB of power storage device B at step S20, engine startup control unit 62 determines whether the fetched temperature TB is lower than a preset threshold value (step S10). This threshold value can be set to an appropriate temperature corresponding to a significant reduction in the output of power storage device B.

When engine startup control unit 62 determines that temperature TB is lower than the threshold value (YES at step S110), control proceeds to step S70 where the boosting rate of up-converter 10 is restricted to be below a prescribed value. When determination is made that temperature TB is lower than the threshold value step S110 (NO at step S110), engine startup control unit 62 proceeds to step S80.

Thus, the boosting regulation of up-converter 10 can be restricted to a low temperature state where the output of power storage device B is degraded. Further, control at the startup of engine 4 can be rendered simple.

Fourth Embodiment

Figure 9:
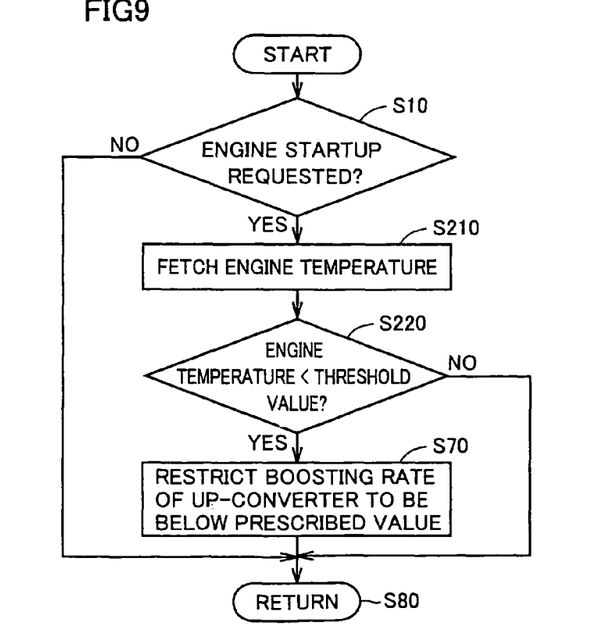
FIG. 9 is a flowchart to describe control of an up-converter in an engine startup mode according to a fourth embodiment.

FIG. 9 is a flowchart to describe control of up-converter 10 in an engine startup mode according to the fourth embodiment. Referring to FIG. 9, the process shown in this flowchart includes steps S210 and S220 instead of steps S20-S60 in the flowchart of FIG. 5. Specifically, when determination is made that a request to start engine 4 is made at step S110, engine startup control unit 62 fetches temperature TE of engine 4 from temperature sensor 84 (step S210).

Then, engine startup control unit 62 determines whether the fetched temperature TE is lower than a preset threshold value (step S220). This threshold value can be set to an appropriate temperature corresponding to a significant increase in the cranking resistance of engine 4.

When engine startup control unit 62 determines that temperature TE is lower than the threshold value (YES at step S220), control proceeds to step S70 where the boosting rate of up-converter 10 is restricted to be below a prescribed value. When determination is made that temperature TE is lower than the threshold value at step S220 (NO at step S220), engine startup control unit 62 proceeds to step S80.

According to the fourth embodiment, the boosting regulation of up-converter 10 can be restricted in a low temperature state where the cranking resistance of engine 4 increases. Furthermore, control at the time of starting engine 4 can be rendered simple.

In the third and fourth embodiments set forth above, up-converter 10 can be stopped as in the second embodiment, instead of the control for restricting up-converter 10 such that the boosting rate of up-converter 10 is restricted to be below a prescribed value.

Although each of the embodiments set forth above is based on the case where the load driving apparatus is incorporated in a hybrid vehicle, the present invention is applicable to a general vehicle including an up-converter that can boost the voltage from a power storage device for supply to a starter motor. Particularly in the case of an idle-stop vehicle that automatically stops the engine temporarily when the vehicle is not running such as at stoplights, and then starts the engine by means of a starter motor when an engine startup condition is established, efficient usage of power is desired since engine startup is effected frequently. The present invention is suitable for such idle-stop vehicles.

In the above description, engine 4 and motor generator MG1 correspond to "internal combustion engine" and "rotating electric machine", respectively, of the present invention. Up-converter 10 and inverter 20 correspond to "boosting device" and "driving device", respectively, of the present invention. Further, engine 60 corresponds to "control device" of the present invention.

It should be understood that the embodiments disclosed herein are illustrative and non-restrictive in every respect. The scope of the present invention is defined by the terms of the claims, rather than the description of the embodiments above, and is intended to include any modification within the scope and meaning equivalent to the terms of the claims.

The invention claimed is:

1. A load driving apparatus capable of driving a rotating electric machine having a rotational shaft coupled to an output shaft of an internal combustion engine, comprising:
    a power storage device,
    a boosting device configured to allow boosting of a voltage from said power storage device,
    a driving device receiving an output voltage from said boosting device to drive said rotating electric machine, and
    a control device controlling said boosting device such that a voltage boosting rate by said boosting device is restricted to be below a prescribed value when said rotating electric machine is driven to start said internal combustion engine.

2. The load driving apparatus according to claim 1, wherein said prescribed value is determined such that said output voltage is substantially equal to the voltage from said power storage device.

3. The load driving apparatus according to claim 1, wherein said control device stops said boosting device when said internal combustion engine is started.

4. The load driving apparatus according to claim 1, wherein said control device controls said boosting device such that said voltage boosting rate is restricted to be below said prescribed value when an output power from said power storage device is lower than a threshold value.

5. The load driving apparatus according to claim 4, wherein said threshold value is determined based on power required to drive said internal combustion engine by said rotating electric machine.

6. The load driving apparatus according to claim 1, wherein said control device controls said boosting device such that said voltage boosting rate is restricted to be below said prescribed value when a temperature of said power storage device is lower than a prescribed temperature.

7. The load driving apparatus according to claim 1, wherein said control device controls said boosting device such that said voltage boosting rate is restricted to be below said prescribed value when a temperature of said internal combustion engine is lower than a prescribed temperature.

8. The load driving apparatus according to claim 1, wherein said power storage device is formed of a lithium-ion secondary battery.

9. A vehicle comprising:
an internal combustion engine,
a rotating electric machine having a rotational shaft connected to an output shaft of said internal combustion engine, and
a load driving apparatus capable of driving said rotating electric machine,
said load driving apparatus including
a power storage device,
a boosting device configured to allow boosting of a voltage from said power storage device,
a driving device receiving an output voltage from said boosting device to drive said rotating electric machine, and
a control device controlling said boosting device such that a voltage boosting rate by said boosting device is restricted to be below a prescribed value when said rotating electric machine is driven to start said internal combustion engine.

10. A control method for a load driving apparatus capable of driving a rotating electric machine having a rotational shaft coupled to an output shaft of an internal combustion engine, said load driving apparatus including
a power storage device,
a boosting device configured to allow boosting of a voltage from said power storage device, and
a driving device receiving an output voltage from said boosting device to drive said rotating electric machine,
said control method comprising the steps of:
determining whether a request to drive said rotating electric machine to start said internal combustion engine is made or not, and
restricting a voltage boosting rate by said boosting device to be below a prescribed value when determination is made that a request to start said internal combustion engine has been made.

11. The control method for a load driving apparatus according to claim 10, wherein said prescribed value is determined such that said output voltage is substantially equal to the voltage from said power storage device.

12. The control method for a load driving apparatus according to claim 10, wherein said boosting device is stopped when determination is made that a request to start said internal combustion engine has been made in said step of restricting the voltage boosting rate.

13. The control method for a load driving apparatus according to claim 10, further comprising the step of determining whether an output power of said power storage device is lower than a threshold value,
wherein said voltage boosting rate is restricted to be below the prescribed value in said step of restricting said voltage boosting rate when determination is made that said output power is lower than said threshold value.

14. The control method for a load driving apparatus according to claim 13, wherein said threshold value is determined based on power required to start said internal combustion engine by said rotating electric machine.

15. The control method for a load driving apparatus according to claim 10, further comprising the step of determining whether a temperature of said power storage device is lower than a prescribed temperature,
wherein said voltage boosting rate is restricted to be below the prescribed value in said step of restricting the voltage boosting rate when determination is made that the temperature of said power storage device is lower than said prescribed temperature.

16. The control method for a load driving apparatus according to claim 10, further comprising the step of determining whether a temperature of said internal combustion engine is lower than a prescribed temperature,
wherein said voltage boosting rate is restricted to be below the prescribed value in said step of restricting said voltage boosting rate when determination is made that the temperature of said internal combustion engine is lower than said prescribed temperature.

* * * * *